April 20, 1926.

W. GOODMAN

LINK

Filed Nov. 28, 1923

1,581,197

Inventor

William Goodman

By Lacey & Lacey, Attorneys

Patented Apr. 20, 1926.

1,581,197

UNITED STATES PATENT OFFICE.

WILLIAM GOODMAN, OF PUEBLO, COLORADO.

LINK.

Application filed November 28, 1923. Serial No. 677,552.

*To all whom it may concern:*

Be it known that WILLIAM GOODMAN, a citizen of the United States, residing at Pueblo, in the county of Pueblo and State of Colorado, has invented certain new and useful Improvements in Links, of which the following is a specification.

This invention relates to improvements in links and has as its object to provide a novel form of link which when interengaged with a similar link or with some other article or object, will not be liable to become separated therefrom, or the article or other object separated from it although the elements may be readily separated when occasion requires. The link embodying the invention is not limited to any particular use, inasmuch as it may be employed in various ways as, for example, as a key ring, a suspension link for a watch charm, a chain link, etc.

Figure 1:
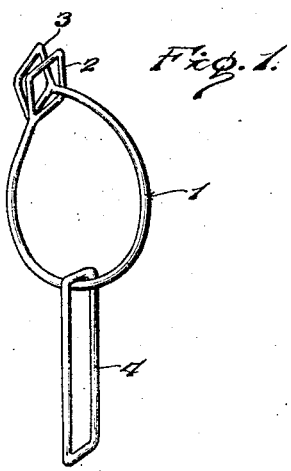
Figure 1 is a perspective view of one form of link embodying the invention.

In that form of the invention shown in Figure 1 of the drawing, and which form is best adapted for use as a key ring, the link is formed from wire or similar material and comprises a link body which is indicated in general by the numeral 1 and which in this instance is preferably of substantially circular form. At one end the body terminates in a head 2 which is substantially tangent to the circle described by the body and this head is in the present instance of hollow substantially rectangular form and disposed substantially in a plane at right angles to the plane occupied by the body of the link as a whole, in addition to being tangent to the circle described by the link body as before stated. The other end of the link body terminates in a head indicated by the numeral 3 which is substantially a counterpart of the head 2, and this last mentioned end of the body 1 is extended through the head 2 so that the head 3 is disposed beyond the plane of the head 2 but, unlike the head 2, occupies a plane substantially coincident with the plane occupied by the body of the link and therefore substantially at right angles to the plane occupied by the said head 2. The heads 2 and 3 are of substantially the same dimensions but it will be evident that the head 3 cannot be drawn through the head 2 to open the link. Therefore, to all intents and purposes, the link body is closed or endless. Keys having properly shaped grip portions, may be readily engaged with a key ring constructed as shown in Figure 1 or, if it is found that keys cannot be readily engaged with the ring, the keys may be individually suspended from links such, for example, as the link 4 shown in the said figure, although this link in itself constitutes no important part of the present invention, it being merely an accessory to the link 1 which is the essential feature. Referring now to Figure 1 it will be evident that while the link 4 cannot become accidently separated from the link 1, such separation may be readily accomplished intentionally, by grasping one end of the link 4 and inserting the other end of the link through the head 2 of the link 1 in a position substantially at right angles to the plane of said head, and then passing the said end of the link 4 about the head 3 whereupon the link 4 may be readily disengaged from the said link 1.

Figure 2:
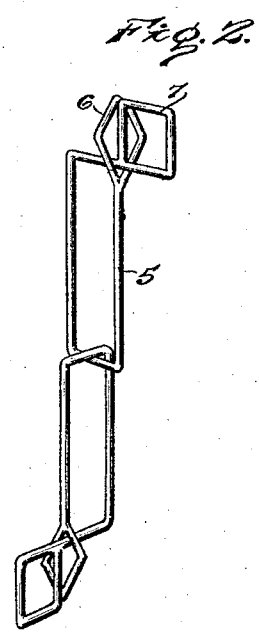
Figure 2 is a perspective view illustrating two connected links of another form.

In that form of the invention shown in Figure 2 of the drawing, the links are substantially of the form shown in Figure 1 except that the bodies of the links, indicated by the numeral 5, are of preferably oblong rectangular form, the bodies being of a width slightly less than the diagonal dimension of the heads of the links which correspond to the heads 2 and 3 in the previously described form and which are here indicated respectively by the numerals 6 and 7. By so forming the bodies of the links, the body of one link may be inserted through the head 6 of another companion link and over the head 7 of said companion link and thus be interlocked with the body of the said other link. It will of course be understood that any desired number of the links may be connected together to form a chain and that the links may vary in size depending upon the character of the chain which is to be formed and the use to which it is to be put.

Figure 3:
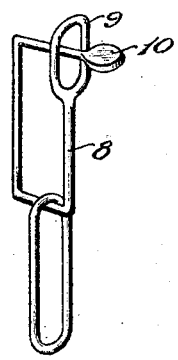
Figure 3 is a perspective view of a further modification of the invention.

In that form of the invention shown in Figure 3, the body of the link is indicated by the numeral 8, and one head of the body is indicated by the numeral 9, this head corresponding to the heads 2 and 6 of the previously described form and being of rectangular form or of the more or less circular form illustrated in the said Figure 3. The other head in this form of link, indicated by the numeral 10, may be in the nature of a flat disc-like body supported by one terminal of the link body 8.

From the foregoing description of the invention it will be seen that there is provided a link which may be employed under various conditions and put to various uses and which may have various parts interlocked with it or it may be interlocked with other companion links. It will also be evident that a part or element interlocked with the link will not become accidentally separated therefrom although such separation may be effected readily when so desired.

Figure 4:
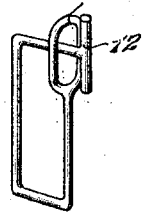
Figure 4 is a similar view illustrating a further modification.

The link shown in Figure 4 of the drawings is substantially of the same construction as the link shown in Figure 3 and embodies an eye 11 and a cross bar or head 12 which is formed at the other end of the link and which is of a length greater than the diameter of the said eye 11.

Having thus described the invention, what is claimed as new is:

1. A link comprising a body provided at one end with an open head, the head being rectangular and united at one corner to the said body, the other end of the body extending through the head, and a rectangular head united at one corner to the last mentioned end of the body of a width to permit of passage through the open head only when its narrowest dimension is presented diagonally of the open head, the heads occupying planes at right angles to each other.

2. A link comprising an elongated body provided at one end with an open head, the other end of the body extending through the said open head and having a head presented edgewise to the open head, said body being of a width permitting of passage through the open head of a companion link whereby when a second link of a duplicate construction is assembled with the first mentioned link its body portion may be passed through the open head of the first-mentioned link and over the second mentioned head for backward withdrawal through the open head and separation from the first mentioned link.

In testimony whereof I affix my signature.

WILLIAM GOODMAN. [L. S.]